United States Patent
Moore

(10) Patent No.: US 9,148,500 B2
(45) Date of Patent: *Sep. 29, 2015

(54) COMMAND PREFIX FOR VOICE COMMANDS

(71) Applicant: AT&T Intellectual Property I, L.P., Atlanta, GA (US)

(72) Inventor: Darryl Cynthia Moore, Social Circle, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,432

(22) Filed: Apr. 11, 2014

(65) Prior Publication Data
US 2014/0222427 A1    Aug. 7, 2014

Related U.S. Application Data

(63) Continuation of application No. 11/649,467, filed on Jan. 4, 2007, now Pat. No. 8,731,146.

(51) Int. Cl.
*H04M 1/64* (2006.01)
*H04M 1/60* (2006.01)
(Continued)

(52) U.S. Cl.
CPC ............ *H04M 1/6075* (2013.01); *G10L 15/26* (2013.01); *G10L 21/06* (2013.01); *H04M 1/271* (2013.01); *H04M 1/2745* (2013.01); *H04M 1/6041* (2013.01); *H04M 1/6505* (2013.01); *H04M 1/7253* (2013.01); *H04M 1/72527* (2013.01); *H04M 1/72597* (2013.01); *H04M 3/533* (2013.01); *H04W 4/12* (2013.01); *H04M 1/2535* (2013.01); *H04M 1/57* (2013.01); *H04M 1/6058* (2013.01); *H04M 1/6066* (2013.01); *H04M 1/663* (2013.01); *H04M 1/7255* (2013.01); *H04M 1/72552* (2013.01); *H04M 2201/40* (2013.01);
(Continued)

(58) Field of Classification Search
CPC .... H04M 1/271; H04M 3/44; H04M 2250/74
USPC .................. 704/246; 379/40, 67.1, 76, 85, 379/88.01–88.04, 88.18, 88.21–88.25, 379/167.08, 234, 263, 373.02; 455/419, 455/557, 569.1, 575.2, 412.1, 413
See application file for complete search history.

(56) References Cited

U.S. PATENT DOCUMENTS 3,617,640 A    11/1971    Cichanowicz
4,340,797 A    7/1982    Takano et al.
(Continued)

OTHER PUBLICATIONS

Motorola, Digital DNA, Product Brief, MC9328MX1P/D, Ref. 2, Feb. 2002 and MC9328MX1 (Dragon Ball™ MX1) Integrated Portable System processor, pp. 1-11 from 02275 CIP.
(Continued)

*Primary Examiner* — Md S Elahee
(74) *Attorney, Agent, or Firm* — Scott P. Zimmerman, PLLC

(57) ABSTRACT

Methods, systems, and products describe hands-free operation of a communications device. A user defines a command prefix that is recognized as preceding one of several voice commands. When the user speaks the command prefix, a processor identifies the spoken command prefix and treats a next spoken word as one of the voice commands. The voice command may then be executed for control. The command prefix thus helps avoid control confusion when the voice command is inadvertently spoken.

20 Claims, 10 Drawing Sheets

(51) Int. Cl.

| | | |
|---|---|---|
| *H04M 1/27* | (2006.01) | |
| *H04M 1/2745* | (2006.01) | |
| *H04M 1/65* | (2006.01) | |
| *H04M 1/725* | (2006.01) | |
| *H04M 3/533* | (2006.01) | |
| *G10L 21/06* | (2013.01) | |
| *H04W 4/12* | (2009.01) | |
| *G10L 15/26* | (2006.01) | |
| *H04M 1/253* | (2006.01) | |
| *H04M 1/57* | (2006.01) | |
| *H04M 1/663* | (2006.01) | |

(52) U.S. Cl.
CPC ....... *H04M 2250/02* (2013.01); *H04M 2250/12* (2013.01); *H04M 2250/58* (2013.01); *H04M 2250/74* (2013.01)

(56) References Cited

U.S. PATENT DOCUMENTS

| | | | |
|---|---|---|---|
| 4,501,012 | A | 2/1985 | Kishi et al. |
| 4,506,142 | A | 3/1985 | Takano et al. |
| 4,935,951 | A | 6/1990 | Robinson et al. |
| 4,993,058 | A | 2/1991 | McMinn et al. |
| 5,012,507 | A | 4/1991 | Leighton et al. |
| 5,161,180 | A | 11/1992 | Chavons |
| RE34,677 | E | 7/1994 | Ray et al. |
| 5,487,175 | A | 1/1996 | Bayley et al. |
| 5,511,111 | A | 4/1996 | Serbetcioglu et al. |
| 5,526,406 | A | 6/1996 | Luneau |
| 5,584,054 | A | 12/1996 | Tyneski et al. |
| 5,621,379 | A | 4/1997 | Collins |
| 5,673,304 | A | 9/1997 | Connor et al. |
| 5,724,412 | A | 3/1998 | Srinivasan |
| 5,726,984 | A | 3/1998 | Kubler et al. |
| 5,796,806 | A | 8/1998 | Birckbichler |
| 5,805,587 | A | 9/1998 | Norris et al. |
| 5,805,672 | A | 9/1998 | Barkat et al. |
| 5,883,942 | A | 3/1999 | Lim et al. |
| 5,913,163 | A | 6/1999 | Johansson |
| 5,940,474 | A | 8/1999 | Ruus |
| 5,940,475 | A | 8/1999 | Hansen |
| 5,978,689 | A | 11/1999 | Tuoriniemi et al. |
| 6,009,148 | A | 12/1999 | Reeves |
| 6,011,473 | A | 1/2000 | Klein |
| 6,104,800 | A | 8/2000 | Benson |
| 6,122,486 | A | 9/2000 | Tanaka et al. |
| 6,144,644 | A | 11/2000 | Bajzath et al. |
| 6,208,718 | B1 | 3/2001 | Rosenthal |
| 6,208,726 | B1 | 3/2001 | Bansal et al. |
| 6,219,413 | B1 | 4/2001 | Burg |
| 6,223,029 | B1 | 4/2001 | Stenman et al. |
| 6,233,464 | B1 | 5/2001 | Chmaytelli |
| 6,259,692 | B1 | 7/2001 | Shtivelman |
| 6,307,920 | B1 | 10/2001 | Thomson et al. |
| 6,310,946 | B1 | 10/2001 | Bauer et al. |
| 6,339,706 | B1 | 1/2002 | Tilgren et al. |
| 6,343,115 | B1 | 1/2002 | Foldare et al. |
| 6,347,136 | B1 | 2/2002 | Horan |
| 6,356,756 | B1 | 3/2002 | Koster |
| 6,434,126 | B1 | 8/2002 | Park |
| 6,476,763 | B2 | 11/2002 | Allen, Jr. |
| 6,487,240 | B1 | 11/2002 | Chen |
| 6,529,500 | B1 | 3/2003 | Pandharipande |
| 6,532,447 | B1 | 3/2003 | Christensson |
| 6,584,439 | B1 | 6/2003 | Geilhufe et al. |
| 6,603,977 | B1 | 8/2003 | Walsh et al. |
| 6,608,886 | B1 | 8/2003 | Contractor |
| 6,622,016 | B1 | 9/2003 | Sladek et al. |
| 6,624,754 | B1 | 9/2003 | Hoffman et al. |
| 6,661,785 | B1 | 12/2003 | Zhang et al. |
| 6,665,388 | B2 | 12/2003 | Bedingfield |
| 6,665,611 | B1 | 12/2003 | Oran et al. |
| 6,674,745 | B1 | 1/2004 | Schuster et al. |
| 6,678,357 | B2 | 1/2004 | Stumer et al. |
| 6,680,998 | B1 | 1/2004 | Bell et al. |
| 6,690,947 | B1 | 2/2004 | Tom |
| 6,703,930 | B2 | 3/2004 | Skinner |
| 6,718,021 | B2 | 4/2004 | Crockett et al. |
| 6,748,224 | B1 | 6/2004 | Odinak |
| 6,771,742 | B2 | 8/2004 | McCalmont et al. |
| 6,792,081 | B1 | 9/2004 | Contractor |
| 6,804,338 | B1 | 10/2004 | Chen |
| 6,842,448 | B1 | 1/2005 | Norris et al. |
| 6,868,074 | B1 | 3/2005 | Hanson |
| 6,912,388 | B2 | 6/2005 | Zirul et al. |
| 6,940,950 | B2 | 9/2005 | Dickinson et al. |
| 7,027,842 | B2 | 4/2006 | Zhang et al. |
| 7,542,787 | B2 | 6/2009 | Zhang et al. |
| 7,899,500 | B2 | 3/2011 | Kreiner et al. |
| 8,433,041 | B2 * | 4/2013 | Clark et al. ................. 379/88.01 |
| 8,731,146 | B2 | 5/2014 | Moore |
| 2002/0016188 | A1 | 2/2002 | Kashiwamura |
| 2002/0025832 | A1 | 2/2002 | Durian et al. |
| 2002/0049596 | A1 | 4/2002 | Burchard et al. |
| 2002/0068610 | A1 | 6/2002 | Anvekar et al. |
| 2002/0072348 | A1 | 6/2002 | Wheeler et al. |
| 2002/0160745 | A1 | 10/2002 | Wang |
| 2002/0181691 | A1 | 12/2002 | Miller et al. |
| 2003/0022701 | A1 | 1/2003 | Gupta |
| 2003/0032449 | A1 | 2/2003 | Giobbi |
| 2003/0211839 | A1 | 11/2003 | Baum et al. |
| 2003/0216148 | A1 | 11/2003 | Henderson |
| 2004/0005914 | A1 | 1/2004 | Dear |
| 2004/0015403 | A1 | 1/2004 | Moskowitz et al. |
| 2004/0037403 | A1 | 2/2004 | Koch |
| 2004/0057425 | A1 | 3/2004 | Brouwer et al. |
| 2004/0101123 | A1 | 5/2004 | Garcia |
| 2004/0140928 | A1 | 7/2004 | Cleghorn |
| 2004/0185915 | A1 | 9/2004 | Ihara et al. |
| 2004/0204207 | A1 | 10/2004 | Parker |
| 2004/0219954 | A1 | 11/2004 | Odinak |
| 2005/0047574 | A1 | 3/2005 | Reid |
| 2005/0063519 | A1 | 3/2005 | James |
| 2005/0151642 | A1 | 7/2005 | Tupler et al. |
| 2005/0175166 | A1 | 8/2005 | Welenson et al. |
| 2005/0190750 | A1 | 9/2005 | Kafka et al. |
| 2005/0190892 | A1 | 9/2005 | Dawson et al. |
| 2005/0232243 | A1 | 10/2005 | Adamczyk et al. |
| 2007/0147348 | A1 | 6/2007 | Lu |
| 2008/0063181 | A1 | 3/2008 | Khouri et al. |

OTHER PUBLICATIONS

Rabiner, Lawrence R., "Applications of Speech Recognition in the Area of Telecommunication," IEEE, AT&T Labs, Florham, Park, NJ, 10 pages, 1997.

O'Reilly, "Control your Car PC with Voice Recognition", 4 pages, Jul. 2005.

US 5,905,788, 05/1999, Bauer et al. (withdrawn)

* cited by examiner

| Voice command | Device Command/Action |
|---|---|
| Pick Up | Answer incoming call |
| Hang Up | Disconnect current call |
| Joe | XXX●XXX●XXXX |
| Hair Salon | YYY●YYY●YYYY |
| Dial | Wait for digits or voice command and dial |
| Ignore | Ignore event |
| Okay | Send |
| Voice mail | Answer incoming call and Send to voice mail |
| Create entry directory | Create new voice command |
| Sleep | Enter sleep mode |
| Wake up | Exit sleep mode |
| Stop | Discontinue Command/Action |
| Record | Record Audio |
| Activate | Power On |
| Deactivate | Power Off |
| Hang Up | Disconnect Communications |
| Unrecognized voice command | Prompt for associated voice command |

FIG. 7

| Event | Event Indicator |
|---|---|
| Incoming Call | Play "incoming call" announcement |
| Incoming Call Waiting | Play "incoming call waiting" announcement |

802 — (Incoming Call row)
804 — (Incoming Call Waiting row)

FIG. 8

| Voice Command | Device Command/Action |
|---|---|
| Read | Open message and read it |
| Reply | Reply to message |
| Delete | Delete message |
| Joe | Joe@ipager.com |
| Forward | Forward message |
| Copy | Send copy of reply to Different address |

FIG. 9

| Event | Event Indicator |
|---|---|
| New message | Play "new message" announcement |

COMMAND PREFIX FOR VOICE COMMANDS

CROSS-REFERENCE TO RELATED APPLICATION

This application is a continuation of U.S. application Ser. No. 11/649,467 filed Jan. 4, 2007 and now issued as U.S. Pat. No. 8,731,146, which is incorporated herein by reference in its entirety.

BACKGROUND

The exemplary embodiments generally relate to providing hands-free operation of a communications device, and more particularly, to providing voice commands that emulate a user's interaction with the communications device.

Mobile communications devices, such as cellular phones, pagers and personal digital assistants ("PDAs"), have made it easier to reach users. Users of the communications devices typically carry the communications devices with them allowing a caller or sender to reach a user regardless of the user's location. However, there are times when a user misses a communication because interacting with the communications device is inconvenient or impossible. If a user is performing a task that requires both hands, then the user may not be able to interact with a communications device to receive a communication. For example, if a parent is grocery shopping with a couple of children, the parent may be using both hands to control the children and the grocery cart and may not be able to handle a mobile telephone to answer an incoming call. Similarly, if a mobile telephone is carried in a purse or a backpack, the user may not be able to locate and answer the telephone before the caller hangs up, especially if the user is also driving a vehicle when the telephone rings.

Although there are currently some solutions that allow a user to use a mobile telephone without having to hold the telephone, these solutions still require the user to interact with the telephone. For example, one solution provides a headset or a speakerphone function so that the user does not have to hold the mobile telephone during a conversation. However, the user is still required to interact with the mobile telephone to receive, end or initiate a telephone call.

Another solution is an auto-dialer that allows a user to dial a telephone number by speaking the number. However, most auto-dialers require that the user place a call using the keypad of the mobile telephone to a remote server. Typically the auto-dialing service is provided by a network element and the user is required to subscribe to the service before using the service.

Furthermore, with the use of mobile communications devices that are portable susceptible to remote service errors, there are times when the user can not access a network voice mail service because communications with the network cannot be established. While the mobile communications device may include caller identification ("CallerID") information, this information is limited to conventional incoming line identification information. Consequently, needs exist for providing an apparatus and method to support completely hands-free operation of a communications device and to provide portable services for the communications device.

SUMMARY

The exemplary embodiments address the above needs and other needs by providing a universal messaging adapter that supports hands-free operation of a communications device. Unlike other solutions that require the user to initially interact with the communications device, the universal messaging adapter is active whenever the communications device is powered so that the universal messaging adapter can be used to perform any function or command that is normally performed by the user interacting with the communications device. Further, the universal messaging adapter communicates with a plurality of communications devices having different communications addresses and enables a portable, universal voice messaging service for the plurality of communications devices.

In accordance with some of the embodiments, the universal messaging adapter includes a user interface for interfacing and communicating with the communications device. For example, the user interface may connect the universal messaging adapter with a mobile telephone, a pager, a personal digital assistant ("PDA"), and other communications devices. Further, the user interface provides information about the status, functionality, and capabilities of the communications device and communicates audio, video, and data with the universal messaging adapter.

The universal messaging adapter also includes memory. The memory stores command prefixes, voice commands, event indicators, customized greetings for an incoming communication to the communications device, and other data. According to some of the embodiments, a command prefix is a word, phrase, and or audible sound (e.g., a whistle) that provides an alert that a subsequent word or phrase is a command to control the communications device. For example, the command prefix is a word or phrase that is not commonly used in conversation, such as "Ziggy." According to further exemplary embodiments, the command to control the communications device may be selected by the user. An example of a voice command may be "pick-up," "answer," "hello," or another expression that indicates an affirmative decision by the user to accept and establish a connection with an incoming communication. That is, for example, when the user says "Ziggy, Pick-Up" the universal messaging adapter sends a communications device command to the communications device to answer the incoming communication. According to still further exemplary embodiments, an event of interest identifies an event indicator selected by the user for receiving information about the communications device. An example of an event indicator is an alert, such as, for example, a special tone or "sparkle" that is presented when the communications device receives an incoming communication (e.g., an incoming telephone call, an incoming email, an incoming text message, etc.). The memory also stores any software that is needed to operate the universal messaging adapter, such as voice recognition software.

In addition, the universal messaging adapter includes a digital signal processor ("DSP"). The DSP processes audio, video, and/or data communications from the user and establishes a communications connection with the communications device. For example, the universal messaging adapter may detect audio signals that are then processed by the DSP to identify voice commands. If the audio signals are part of a telephone conversation, then the audio signals are passed through to the communications device. However, if the audio signals correspond to a voice command, then the voice command is recognized by the DSP and is processed accordingly. The DSP may also provide event indicators to the universal messaging adapter for further processing. If the user selects an event indicator message that requires the generation of speech, then the DSP performs the voice synthesis. The interface between the universal messaging adapter and the device can be a wireless or a wired interface.

The universal messaging adapter may include an optional computer interface. The computer interface allows the universal messaging adapter to communicate with a computer using any of a variety of well-known protocols. The computer interface may be used to configure and "train" the universal messaging adapter for voice recognition. The computer interface may also be used to transfer user preference information from one universal messaging adapter to another universal messaging adapter, to back up the user preference information or to upgrade features of the universal messaging adapter. Configuration of the universal messaging adapter includes programming user preferences into the memory. User preferences include a personal directory that associates an identifier, such as a name, with a communications address, such as a telephone number or pager address. User preferences also include the selection of other voice commands and event indicators. For example, the user may associate one of the voice commands and/or an incoming communications address with a customized greeting. Consequently, if the voice command "Ziggy, Play Arnold" is an associated with the customized greeting "I'll be back, so leave a message," then when there is an incoming communication and the user provides this voice command, a communications connection is established with the communications device, the communications connection interfaces the universal messaging adapter, and the universal messaging adapter present the message "I'll be back, so leave a message." Thereafter, the universal messaging adapter may record a message from a caller or other party of the incoming communication.

The universal messaging adapter can be connected to the communications device using a wired or a wireless interface. The universal messaging adapter can be a separate communications device that is connected to the communications device or can be integrated into the communications device. The user interface used with the universal messaging adapter includes a speaker and a microphone. For example, the universal messaging adapter may be integrated into a headset or may be integrated into another article, such as, for example a pair of glasses, a glasses' strap, a hat, or a vehicle.

The universal messaging adapter monitors the communications device via the user interface. Whenever the user interface detects an event of interest, the user interface notifies the user by sending an event indicator to the universal messaging adapter. For example, the event indicator may be a message, such as a message previously recorded by the user or a standard message, or a tone or series of tones. According to further embodiments, the event indicator may be overlaid and presented to the universal messaging adapter (or peripheral device) during an established communications connection. And, the presentation of the event indicator during an established communication may only be presented to the user of the universal messaging adapter and not to another party on the communications connection.

According to exemplary embodiments, the voice command includes a command prefix and a command to control the communications device. The command prefix may be provided by the manufacturer, may be selected by the user, or may be inferred by the universal messaging device. For example, the command prefix may be a word, phrase, or gesture (e.g., body movement). To issue a command, the user says both the command prefix and a command. When the universal messaging adapter detects the command prefix, the universal messaging adapter treats the next word as a command. In addition, if the universal messaging adapter is passing audio signals to the communications device, then the universal messaging adapter mutes the audio to the communications device, so that the voice command is not provided to the communications device. The command prefix allows the user to use a voice command in conversation without triggering a communications device command because the voice command is only effective if the voice command is preceded by the command prefix. Alternatively, the universal messaging adapter may use context to recognize a command without the use of a command prefix.

The universal messaging adapter can also provide additional functions to the user. For example, a universal messaging adapter communicating with a cellular phone may provide caller identification and voice mail to the user. If the universal messaging adapter detects an incoming call from one of the telephone numbers stored in its memory, then the universal messaging adapter identifies the caller to the user. Voice mail can be provided using the DSP and memory of the universal messaging adapter. The user can send an incoming call to voice mail, rather than answer the call. If so, then the universal messaging adapter plays an outgoing greeting that may be customized to the caller (e.g., customized based upon the voice command, by recognition of the incoming caller identification signal, etc.) and records a message from the caller.

Other systems, methods, and/or computer program products according to exemplary embodiments will be or become apparent to one with skill in the art upon review of the following drawings and detailed description. It is intended that all such additional systems, methods, and/or computer program products be included within and protected by this description and be within the scope of the present invention.

DESCRIPTION OF THE DRAWINGS

The above and other embodiments, objects, uses, advantages, and novel features are more clearly understood by reference to the following description taken in connection with the accompanying figures, wherein:

FIG. 7 is a diagram that illustrates an exemplary map of a voice command associated with a communications device command according to some of the embodiments of this invention.

FIG. 8 is a diagram that illustrates an exemplary map of a communications device event associated with an event indicator according to some of the embodiments of this invention.

FIG. 9 is a diagram that illustrates yet another exemplary map of a voice command associated with a communications device command according to some of the embodiments of this invention.

FIG. 10 is a diagram that illustrates yet another exemplary map of a communications device event associated with an event indicator according to some of the embodiments of this invention.

DESCRIPTION

Figure 1:
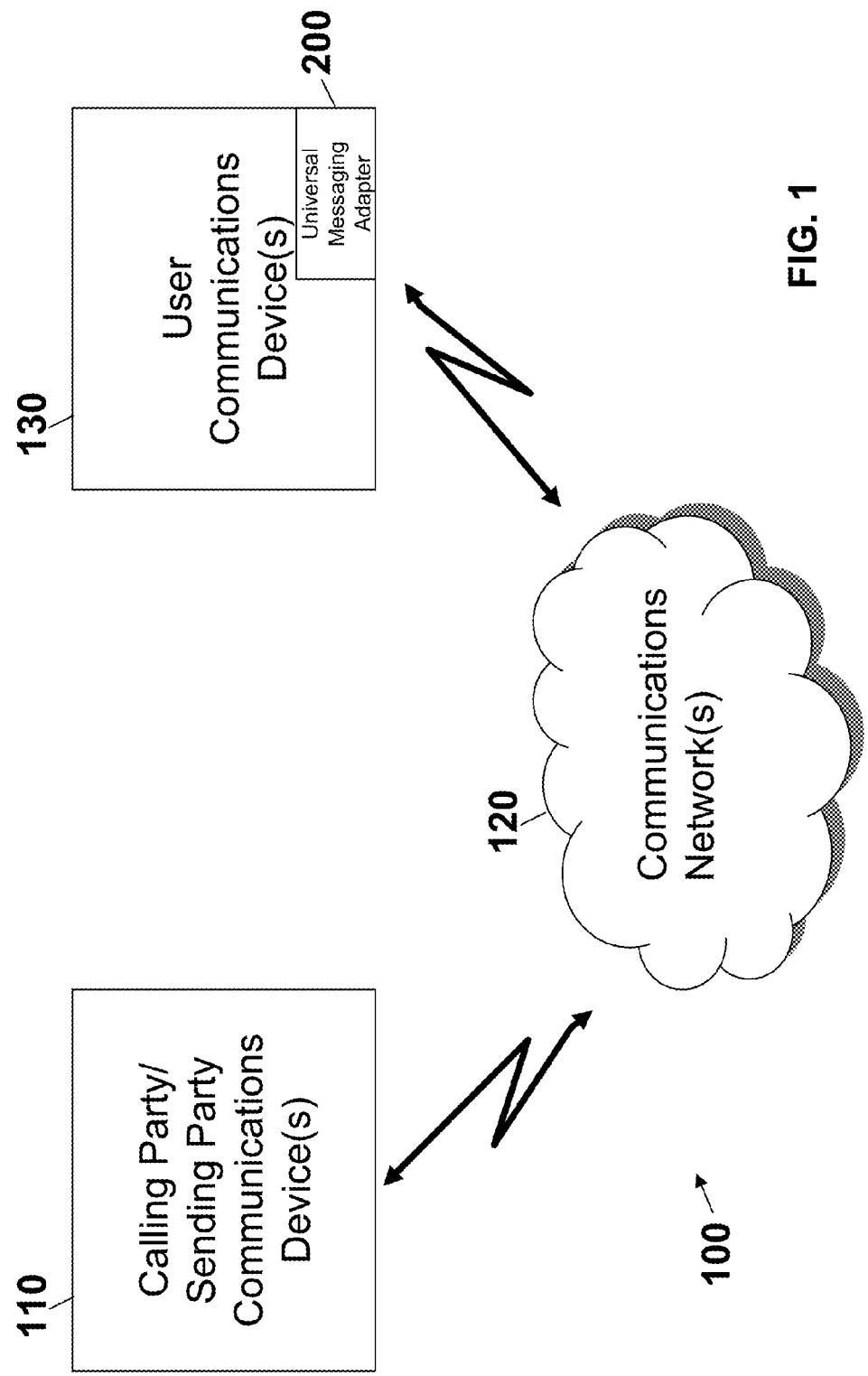
FIG. 1 is a simplified schematic of an operating environment illustrating communications with a universal messaging adapter integrated with one or more communications devices according to some of the exemplary embodiments.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and communications devices for providing hands-free operation of a communications device. Briefly described, a universal messaging adapter (also referred to herein as a "hands free adapter") communicates with the communications device, and in some embodiments, with a peripheral device such as another communications device, a headset, and other devices. The universal messaging adapter allows a user to use voice commands so that the user does not have to handle the communications device. The universal messaging adapter receives voice commands from a user interface and translates the voice commands to commands recognized by the communications device. The universal messaging adapter also monitors the communications device to detect communications device events and provides notice of the events to the user. Still further, the universal messaging adapter presents customized voice messaging tools that enable a portable voice messaging service that the user may use with a plurality of communications devices.

As used herein, the terms "user," "subscriber," and "individual" are used to describe one or more persons that may actively (e.g., by speaking voice commands) or passively interact with the hands free adapter and/or a peripheral device. As used herein, the term "communications device" includes wired and wireless communications devices, such as a mobile phone, a wireless phone, a WAP phone, a satellite phone, a computer, a modem, a pager, a digital music communications device, a digital recording communications device, a personal digital assistant, an interactive television, a digital signal processor, and a Global Positioning System communications device. The communications device may include any computer, peripheral communications device, camera, modem, storage communications device, telephone, personal digital assistant, and/or mobile phone. As described herein, any of the communications network(s) may include coaxial cables, copper wires, fiber optic lines, and/or hybrid-coaxial lines. The communications network(s) may be a cable network operating in the radio-frequency domain and/or the Internet Protocol (IP) domain. The communications network (s), however, may also include a distributed computing network, such as the Internet (sometimes alternatively known as the "World Wide Web"), an intranet, a local-area network (LAN), and/or a wide-area network (WAN). The communications network(s) may even include wireless portions utilizing any portion of the electromagnetic spectrum and any signaling standard (such as the I.E.E.E. 802 family of standards).

Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with the user, and/or (4) profiles associated with the universal messaging adapter. Still further, the term "processing," as used herein, encompasses every event from the time the incoming communications device is detected to the termination of the communications signal (e.g., hanging up the telephone call). "Processing" of the incoming communication may include routing a voice path and signaling setup and intelligence (e.g., Local Number Portability queries, queries to retrieve Calling Name/Number information, intelligence queries by the AIN components, and standard signaling messages to determine communications routing paths). The term "processing" also includes monitoring an established communications connection for a caller identification (ICLID) signal, activation of switch hook flash, detecting an incoming call waiting signal, and other events that indicate a party on the communications connection has requested an action. Further, the universal messaging adapter communicates with a plurality of communications devices having different communications addresses and enables a portable, universal voice messaging service for the plurality of communications devices.

Referring now to the figures, FIG. 1 is a simplified schematic of an operating environment 100 illustrating one or more calling party or sending party communications devices 110 (also referred to as a "sender's communications device"), at least one communications network 120, and one or more user communications devices 130 having a Universal Messaging Adapter 200. A calling party uses one of his/her communications devices 110 to initiate a communication to the user. The communications network 120 communicates the incoming communications signal to the user communications device 130. According to an exemplary embodiment, the incoming communications signal may include incoming line identification (ICLID) information and other information associated with the incoming communication, such as, for example, an identifier of an originating communications address (e.g., name of sender, address of the sender's communications device, such as the sender's telephone number, etc.), and/or an identifier of the sender's party communications device (e.g., POTS phone, cellular phone, personal digital assistant, VOIP phone, etc.) and this information is processed according to embodiments described further herein.

Figure 2:
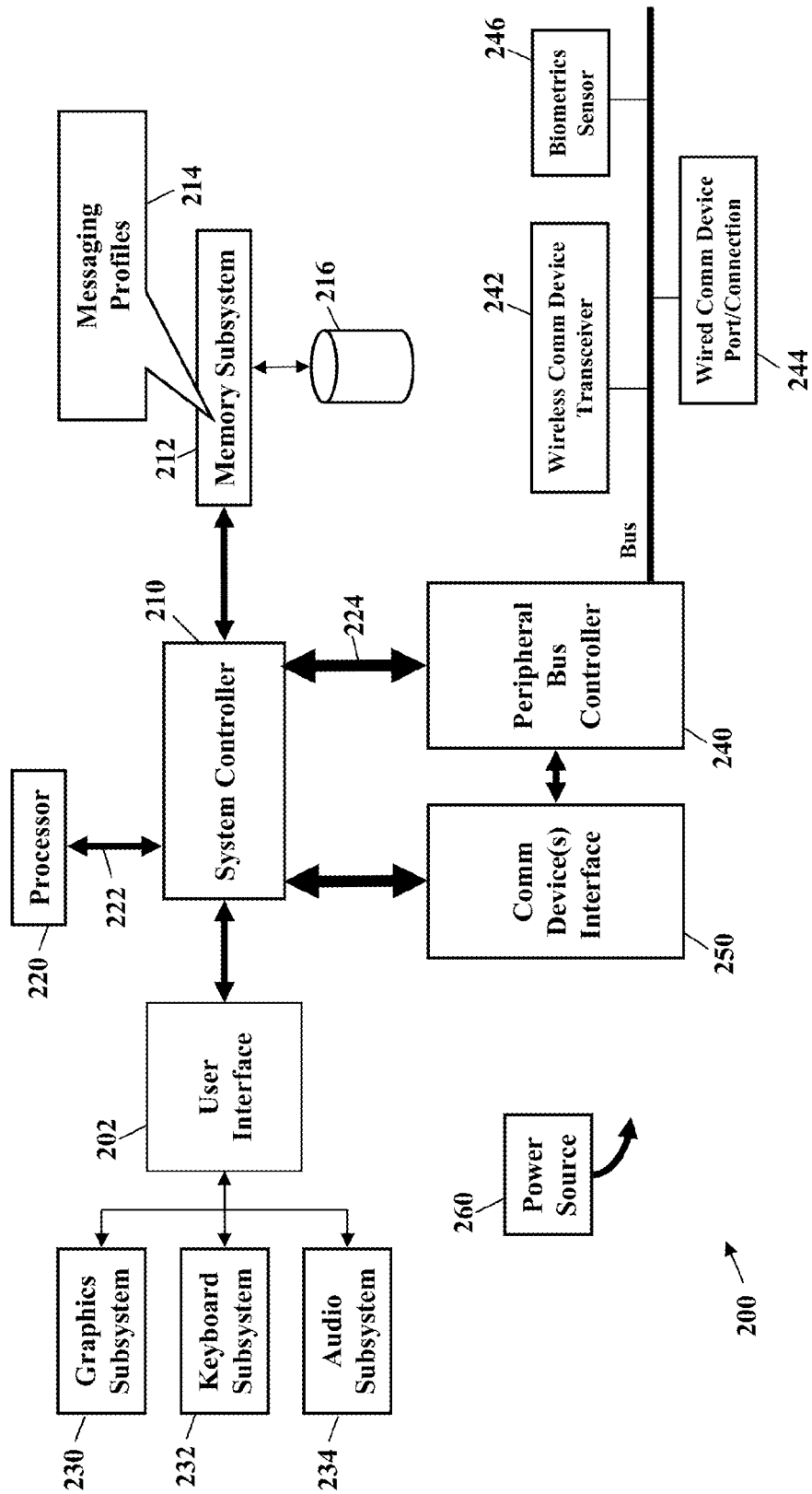
FIG. 2 is a block diagram of a universal messaging adapter according to exemplary embodiments of this invention.

FIG. 2 is a block diagram of a universal messaging adapter 200 according to exemplary embodiments of this invention. The universal messaging adapter 200 includes a user interface 202 for interfacing with the communications device (illustrated as reference numeral 130 in FIGS. 1, 3, and 4). The universal messaging adapter 200 operates within a system memory device 212. The universal messaging adapter 200, however, could also reside in flash memory or a peripheral storage communications device 216. The universal messaging adapter 200 also has one or more central processors (e.g., one or more digital signal processors (DSPs)) 220 executing an operating system. The operating system, as is well known, has a set of instructions that control the internal functions of the universal messaging adapter 200. A system bus 222 communicates signals, such as data signals, control signals, and address signals, between the central processor(s) 220 and a system controller 210. The system controller 210 provides a bridging function between the memory subsystem 212, the one or more central processors 220, the user interface 202 coupled with input and output components that may include a graphics subsystem 230, a keyboard subsystem 232, an audio subsystem 234, a PCI (Peripheral Controller Interface) bus 224, and a Communications ("Comm") Device Interface 250. The PCI bus 224 is controlled by a Peripheral Bus Controller 240. The Peripheral Bus Controller 240 is an integrated circuit that serves as an input/output hub for various peripheral ports and/or transceivers. These peripheral ports allow the universal messaging adapter 200 to communicate with a variety of communications devices through networking ports (such as SCSI or Ethernet) that include Wireless Communications ("Comm") Device Transceiver 242 (such as Wireless 802.11 and Infrared) and Wired Communications ("Comm") Device Port/Connection 244 (such as modem V90+ and compact flash slots). These peripheral ports could also include other networking ports, such as, a serial port (not shown) and/or a parallel port (not shown). The Comm Device Interface 250 allows the universal messaging adapter 200 to monitor, detect, receive, and decode incoming communications signals to the communications device(s) (and/or a peripheral communications device) connected to the Wireless Comm Device Transceiver 242 and/or the Wired Comm Device Port/Connection 246. Further, the Comm Device Interface 250 transmits the device commands to the communications device(s). Still further, the universal messaging adapter 200 may include a power source 260, such as a rechargeable battery to provide power and allow the universal messaging adapter 200 to be portable. In alternate embodiments, the universal messaging adapter 200 could include its own telephone line (or other communications connection) to a communications network. Another alternative may include the universal messaging adapter 200 incorporated into a specially designed communications device.

The system memory device (shown as memory subsystem 212 or peripheral storage communications device 216) stores a command prefix, voice commands, event indicators, and other information. According to some of the embodiments, a command prefix is a word, phrase, and or audible sound (e.g., a whistle) that provides an alert that a subsequent word or phrase is a command to control the communications device. Typically, the command prefix is a word that is not commonly used in conversation, such as "Ziggy." According to further exemplary embodiments, the command to control the communications device may be selected by the user. An example of a voice command may be "pick-up," "answer," "hello," or another expression that indicates an affirmative decision by the user to accept and establish a connection with an incoming communication. That is, for example, when the user says "Ziggy, pick-up" the universal messaging adapter 200 sends a communications device command to the communications device to answer the incoming communication. According to still further exemplary embodiments, an event of interest identifies an event indicator selected by the user for receiving information about the communications device. An example of an event indicator is an alert, such as, for example, a special tone or "sparkle" that is presented when the communications device receives an incoming communication (e.g., an incoming telephone call, an incoming email, an incoming text message, etc.). The system memory device also stores the software needed to operate the universal messaging adapter, such as voice recognition software.

The system memory device (shown as memory subsystem 212 or peripheral storage communications device 216) may also contain one or more application programs. For example, an application program may cooperate with the operating system and with a video display unit (via the graphics subsystem 230) to provide a GUI for the universal messaging adapter 200. The GUI typically includes a combination of signals communicating with the graphics subsystem 230 and/or the keyboard subsystem 232. The GUI provides a convenient visual and/or audible interface with the user of the universal messaging adapter 200. As is apparent to those of ordinary skill in the art, the user interacts with the universal messaging adapter 200 over a variety of mediums, such as, for example, a stylus, keyboard, and punch buttons of the keyboard subsystem 232, a display screen of the graphics subsystem 230, and/or a voice-activated menu prompt of the audio subsystem 234. Additionally, the peripheral bus controller 240 provides an interface with a biometrics sensor 246, such as, for example, a fingerprint ID communications device. The biometrics sensor 246 may distinguish between different users that share or otherwise use the universal messaging adapter 200. Further, the biometrics sensor 246 may provide security features that prevent unauthorized users from exploiting the universal messaging adapter 200. The biometrics sensor 246 could also comprise retina recognition communications device and software, DNA/RNA recognition communications device and software, facial recognition communications device and software, speech recognition communications device and software, and/or scent recognition communications device and software. Still further, the peripheral bus controller 240 may provide an interface with a presence detector (not shown) or a motion sensor (not shown) to detect gestures that comprise the voice command.

According to an exemplary embodiment, the user interface 202 shown in FIG. 2 may comprise a "feature connector interface" (not shown) for interfacing with a mobile telephone. For example, many mobile or cellular telephones include a feature connector. The feature connector provides signals that indicate the status of the mobile telephone, such as incoming call, voice message, missed call, etc. The feature connector also provides the audio signals received by the mobile telephone. According to some of the embodiments, the feature connector transceives (i.e., transmits and receives) audio signals from the universal messaging adapter 200 and the mobile telephone processes the audio signals in the same manner that it would process audio signals received from the microphone built into the mobile telephone. The feature connector also receives commands from the universal messaging adapter 200, and the mobile telephone processes the commands in the same manner that it would process commands received from the keypad built into the mobile telephone. The feature connector also includes a power connection so that the mobile telephone can be powered via the power connection. Although most mobile telephones include a feature connector, the physical configuration of the feature connector and/or the communication protocol used by the feature connector may vary by model and/or manufacturer. Therefore, the user interface 202 shown in FIG. 2 may be customized for use with a particular manufacturer's communications device and/or with a particular type of communications device (e.g., cell phone, Voice over Internet Protocol (VoIP) phone, personal digital assistant (PDA), etc.).

According to some of the embodiments, if the universal messaging adapter 200 interfaces with a wire line telephone, a pager, a personal digital assistant ("PDA"), a VoIP Phone, or any communications device with a digital signal processor, then the universal messaging adapter 200 may be integrated into the communications device 130 itself and the user interface 202 is not needed. And, according to further exemplary embodiments, the universal messaging adapter 200 connects to an external interface of the communications device (e.g., a communications port of a computer, pager, PDA, etc).

The universal messaging adapter 200 of FIG. 2 may include an optional computer interface (not shown). The computer interface allows the universal messaging adapter 200 to communicate with a computer (not shown) using any of a variety of well-known protocols. The computer interface may be used to configure and "train" the universal messaging adapter 200 for voice recognition. In accordance with some of the embodiments, the voice recognition function of the universal messaging adapter 200 are user-dependent and require training to recognize the voice commands issued by the user. In accordance with further exemplary embodiments, the voice recognition function is user-independent. Alternatively, the user interface 202 may be used instead of the computer interface to interface the universal messaging adapter 200 to the computer.

According to exemplary embodiments, the computer interface (or, alternatively, the user interface 202) may be used to configure the universal messaging adapter 200. Configuration typically includes selecting features and programming user preferences into the system memory device (shown as memory subsystem 212 or peripheral storage communications device 216). According to exemplary embodiments, these selections are stored in a Universal Adapter Messaging Profile 214 of the system memory device 212, 216 and are maintained for each user of the universal messaging adapter 200. For example, within a family, a parent may have a profile that includes one or more unique command prefixes associated with the parent, the parent's personal directory, selected features, and other options associated with the parent and a child may have a different profile that includes one or more different, unique command prefixes associated with the child, the child's personal directory, selected features and other options associated with the child. The Universal Adapter Messaging Profile 214 may also include a selection of a language preference for each user so that the universal messaging adapter 200 is programmed to operate with a particular language (e.g., English, Spanish, etc.). Examples of features may include voice mail, caller identification, greetings, forwarding messages, storing messages, and others. Examples of user preferences may include voice commands and event indicators. The universal messaging adapter 200 supports voice commands for creating a personal directory so that the user can associate an identifier, such as a name associated with an incoming communications address. Examples of communications addresses include a telephone number or an electronic data communications address, such as a pager or e-mail address. The computer interface 202 may also be used to transfer user preference information from one universal messaging adapter 200 to another universal messaging adapter (not shown), back up the user preference information, or add new features to the universal messaging adapter 200.

The optional power source 260 is shown in the exemplary universal messaging adapter 200 of FIG. 2. According to exemplary embodiments, the universal messaging adapter 200 is operational whenever the communications device 130 is powered. The universal messaging adapter 200 can share a battery, share a power source used by the communications device 130, or use the power source 260. In accordance with some of the embodiments, the power source 260 provides power to the universal messaging adapter 200 and may also provide a back-up power source for the communications device 130. According to the exemplary embodiments, if the communications device 130 is a mobile telephone, then the universal messaging adapter 200 may be built into a battery pack.

The components shown in FIG. 2 are exemplary. Additional and/or alternative components may also be used. Although separate components are shown in FIG. 2, the components may be integrated into one or more components. For example, Motorola provides the MC9328MX1 processor that includes a microprocessor, memory controller, BLUETOOTH accelerator and multimedia accelerator that could be used in the universal messaging adapter 200.

Figure 3:
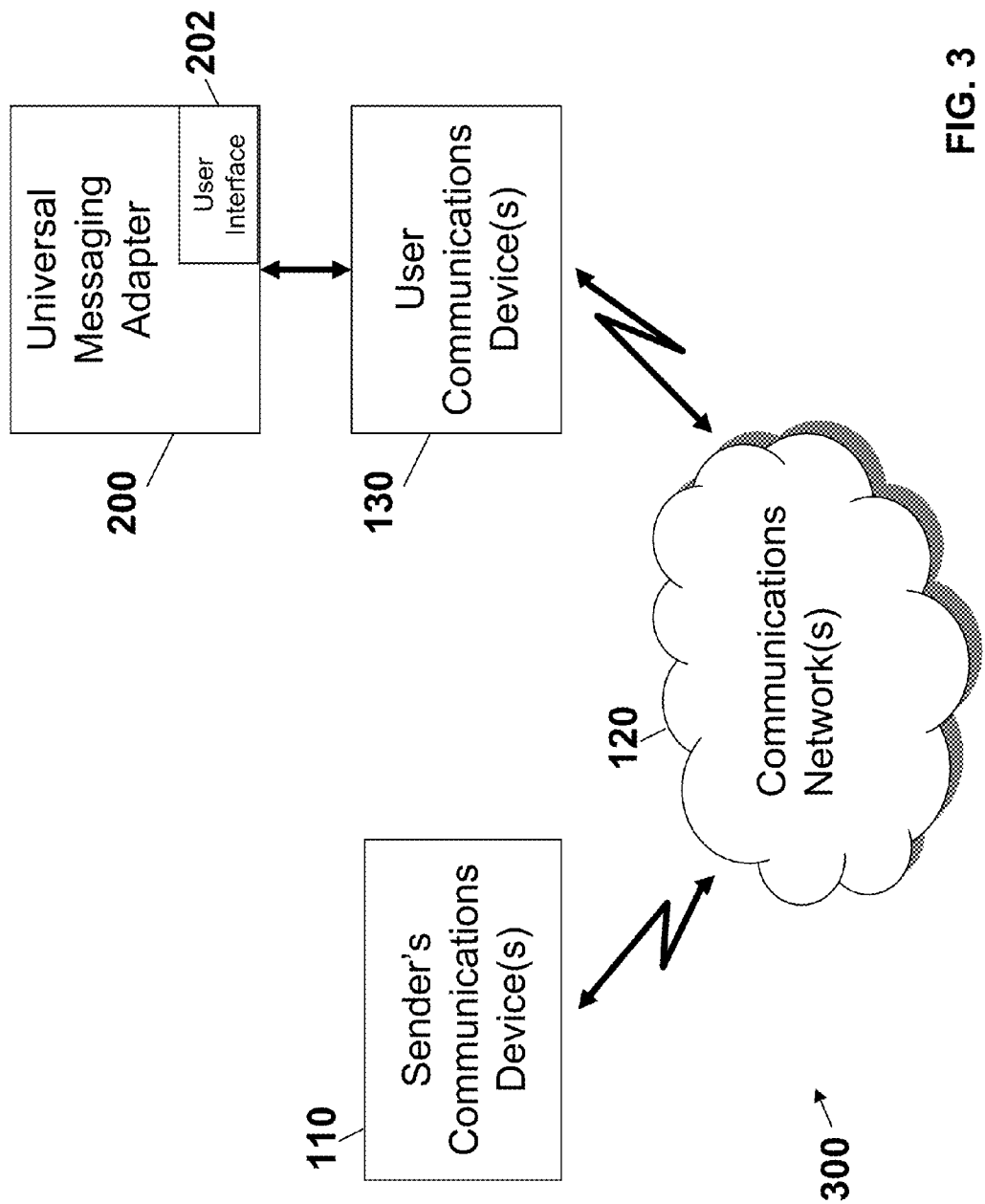
FIG. 3 is a schematic of an exemplary operating environment illustrating a universal messaging adapter coupled with one or more communications devices according to exemplary embodiments of this invention.
Figure 4:
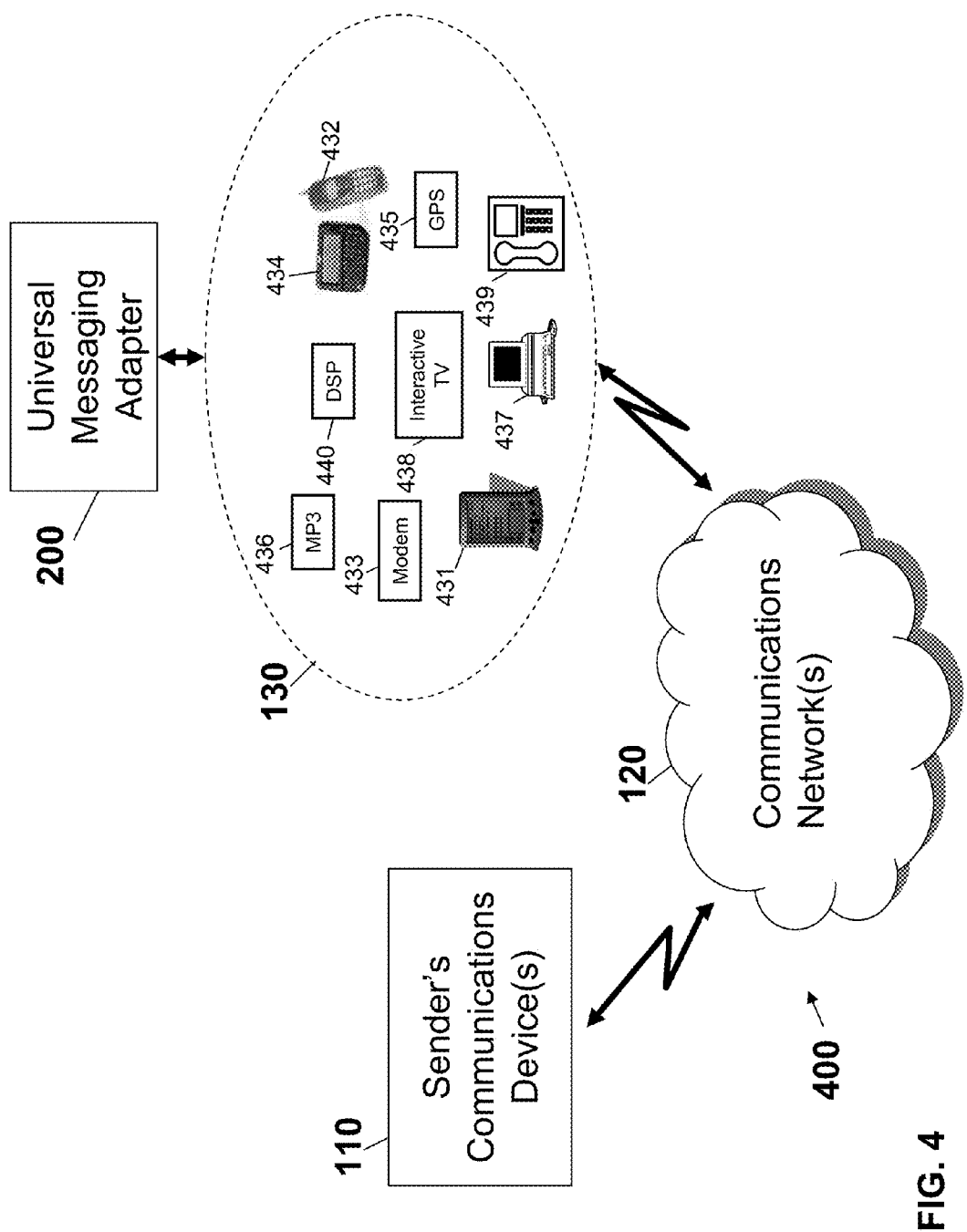
FIG. 4 is a schematic of an exemplary operating illustrating a universal messaging adapter communicating with alternative communications devices according to exemplary embodiments of this invention.

FIG. 3 illustrates a simplified schematic of an operating environment 300 illustrating one or more of the sender's communications devices 110, at least one of the communications network 120, and one or more of the user communications devices 130 coupled with the universal messaging adapter 200. That is, the universal messaging adapter 200 may be a portable device that connects with one or more of the user communications devices 130 to provide hands free operation and portable messaging services. FIG. 4 is schematic of an operating environment 400 similar to the operating environment 300 of FIG. 3; however operating environment 400 illustrates various types of the communications devices 130 that may interface with the universal messaging adapter 200. These various types of communications devices 130 may include a personal digital assistant (PDA) 431, a Voice over Internet Protocol (VOIP) phone 432, a modem 433, an interactive pager 434, a Global Positioning System (GPS) device 435, a digital musical recorder device 436, a computer 437, an interactive television 438, a Plain Old Telephone System (POTS) phone 439, and/or any computer system utilizing a digital signal processor 440. The communications device 130 may also include watches, radios, vehicle electronics, clocks, printers, gateways, and other apparatuses and systems. As those of ordinary skill in the art understand, the universal messaging device 200 has the intelligence for appropriate formatting for communications with the communications device 130. For example, if the communications device 130 uses the Wireless Application Protocol (WAP) technique, then the universal messaging adapter 200 is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

In accordance with some of the embodiments, the universal messaging adapter 200 is powered whenever the communications device 130 is powered so that the universal messaging adapter 200 may be used to perform any function or command that is normally performed by a user interacting with the communications device 130. The universal messaging adapter 200 monitors the communications device 130 via the user interface 202. Whenever the universal messaging adapter 200 detects an event of interest, the universal messaging adapter 200 notifies the user by sending an event indicator. The event indicator may be a message, such as a message previously recorded by the user during configuration or a standard message, or a tone or series of tones. For example, a message stating "incoming communication" can be used to alert the user to an incoming communication. Alternatively, a particular tone or "sparkle" can be used to alert the user to an incoming call. And, in some of the embodiments, the event indicator is overlaid on any existing communication (e.g., during a conversation between the user and a calling party) and is only played to the user. For example, if the user is participating in a telephone conversation when the universal messaging adapter 200 detects the event, such as incoming call waiting, then the event indicator is provided to the user and is not detectable by the original caller.

Configuration of the universal messaging adapter 200 includes programming user preferences into memory, such as the memory subsystem 212. User preferences include a personal directory that associates an identifier, such as a name, with a communications address, such as a telephone number or pager address. User preferences also include the selection of other voice commands and event indicators. For example, the user may associate one of the voice commands and/or an incoming communications address with a customized greeting. Consequently, if the voice command "Ziggy, Play Arnold" is associated with the customized greeting "I'll be back, so leave a message," then when there is an incoming communication and the user provides this voice command, a communications connection is established with the communications device, the communications connection interfaces the universal messaging adapter 200, and the universal messaging adapter 200 presents the message "I'll be back, so leave a message." Thereafter, the universal messaging adapter 200 may record a message from a caller or other party of the incoming communication.

According to exemplary embodiments, the voice command includes a command prefix and a command to control the communications device. The command prefix may be provided by the manufacturer, may be selected by the user, or may be inferred by the universal messaging adapter 200. For example, the command prefix may be a word, phrase, or may even include a body gesture. The body gesture, for example, may include pointing a finger at the communications device 130 which may be interpreted as a device command, such as, to "turn on" or "turn off" the communications device 130. Use of a body gesture may be desirable when the user is not capable of providing an identifiable audible sound, such as when the user is eating or engaged in an active conversation. Further, use of a body gesture may have offer more universal functionality as it does not require interpretation of different languages (e.g., English, French, Spanish, etc.).

According to exemplary embodiments, to issue a command, the user says both the command prefix and a command. When the universal messaging adapter 200 detects the command prefix, the universal messaging adapter 200 treats the next word as a command. If the universal messaging adapter 200 is passing audio signals to the communications device 130, then the universal messaging adapter 200 may mute the audio to the communications device 130, so that the voice command is not provided to the communications device 130. The command prefix allows the user to use a voice command in conversation without triggering a communications device command because the voice command is only effective if the voice command is preceded by the command prefix. Alternatively, the universal messaging adapter 200 may use context to recognize a command without the use of a command prefix.

The universal messaging adapter 200 may also provide additional functions to the user. For example, the universal messaging adapter 200 communicating with a cellular phone may provide caller identification and voice mail to the user. If the universal messaging adapter 200 detects an incoming call from one of the telephone numbers stored in its memory, then the universal messaging adapter 200 identifies the caller to the user. Voice mail can be provided using the one ore more central processors 220, such as one or more diginal signal processors, and the memory 212, 216 of the universal messaging adapter 200. The user can send an incoming call to voice mail, rather than answer the call. If so, then the universal messaging adapter 200 plays an outgoing greeting that may be customized to the caller (e.g., customized based upon the voice command, by recognition of the incoming caller identification signal, etc.) and records a message from the caller.

In accordance with some of the embodiments, the universal messaging adapter 200 does not modify any of the communications device settings. Therefore, if the communications device 130 is a cellular telephone and the ringer is activated, then the telephone rings whenever an incoming call is received. In addition, the universal messaging adapter 200 sends an incoming call alert to the user. And, in accordance with some of the embodiments, the universal messaging adapter 200 may not disable a keypad of the communications device 130. Therefore, the user can use either the headset or the keypad depending upon which is most convenient.

The exemplary embodiments include a command prefix that is used in addition to a command to control a communications device, such as the communications device 130, so that a user does not inadvertently cause the communications device to perform an unintended action. The command prefix may be provided by the manufacturer or selected by the user. According to some of the embodiments, the command prefix is a word, phrase, or audible sound that the user does not routinely use in conversation. According to exemplary embodiments, to issue a command, the user says both the command prefix and a command. The command prefix can be selected during configuration of the universal messaging adapter 200. When the universal messaging adapter 200 detects the command prefix, the universal messaging adapter 200 treats the next word as a command. In addition, if the universal messaging adapter 200 is passing audio signals from the headset to the communications device 130, then the universal messaging adapter 200 mutes the audio to the communications device 130, so that the voice command is not provided to the communications device 130. For example, if the user selects "Ziggy" as the command prefix, then the user says "Ziggy" before each voice command. This allows the user to use a voice command in conversation without triggering a communications device command because the voice command is only effective if the voice command is preceded by the command prefix. Thus, if "hang up" is a voice command to disconnect a call, then the user says "Ziggy, hang up" to hang up the communications device 130. Conversely, if the user uses the phrase, "hang up" in normal conversation without the command prefix, then the universal messaging adapter 200 may not interpret "hang-up" as a voice command. According to alternate embodiments, the command prefix may include alternate triggers, such as, for example, body movement (e.g., hand, eyes, head, etc.).

In accordance with some of the embodiments, a command prefix is not required for all commands. That is, the universal messaging adapter 200 uses context to recognize a command. For example, if an incoming call is detected, then the universal messaging adapter 200 expects to receive a voice command. Consequently, if the user says "pick up," then the universal messaging adapter 200 recognizes a portion of the voice command (i.e., the command to control the communications device) and interprets the input as a command to answer the call. The universal messaging adapter 200 then notifies the user of the interpretation and prompts the user to confirm execution of the command. For example, if the user says "pick up" during an incoming call, then the hands free adapter may inquire "do you want to answer the incoming call?" If the user says "yes" or otherwise affirmatively responds, the user interface instructs the mobile telephone to answer the call.

Figure 5:
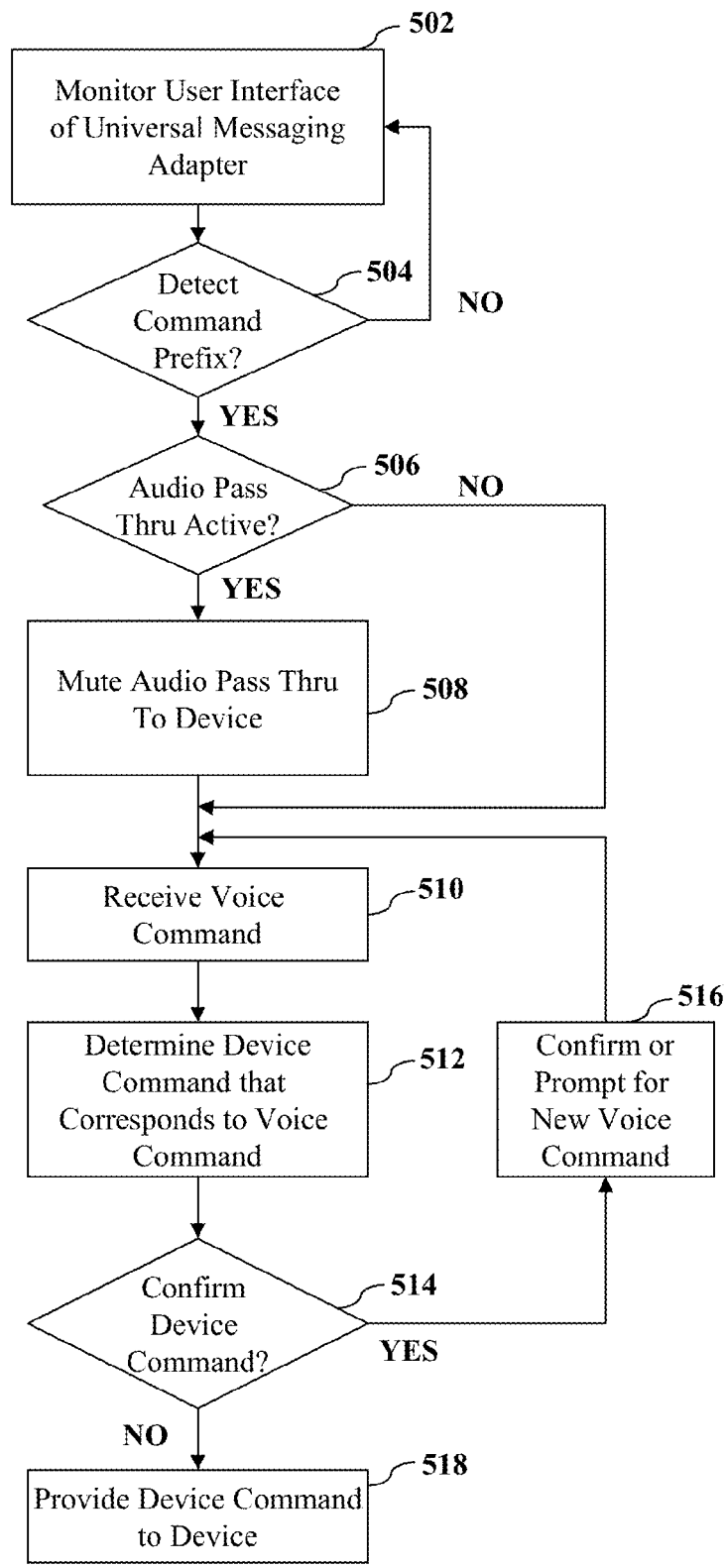
FIG. 5 is a flow chart illustrating a method for generating a communications device command according to exemplary embodiments of this invention.

FIG. 5 illustrates an exemplary method for handling voice commands. In step 502, the universal messaging adapter 200 monitors the user interface 202 for voice commands, such as audio signals (alternate embodiments may include presence detection or motion detection commands). As audio signals are received, the universal messaging adapter 200 analyzes the audio signals in step 504 to determine whether the audio signals correspond to a command prefix. If a command prefix is not detected, then the "No" branch proceeds back to step 502 and the universal messaging adapter 200 continues to monitor the audio signals received from the headset. If a command prefix is detected, then the "Yes" branch proceeds to step 506.

In step 506, a determination is made as to whether audio signals are being passed from the headset to the communications device 130. For example, if the communications device 130 is a mobile telephone, then audio signals are passed from the headset to the mobile telephone during a telephone conversation. If audio signals are being passed to the communications device 130, then the "Yes" branch proceeds to step 508 and the audio signals are muted in step 508 so that the voice command is not forwarded to the communications device 130. From step 508, the method proceeds to step 510. If the determination in step 506 is that audio signals are not being passed to the communications device 130, then the "No" branch is followed to step 510. In step 510, the universal messaging adapter 200 receives the voice command. The universal messaging adapter 200 determines the communications device command that corresponds to the voice command in step 512. In step 514, a determination is made whether to confirm the communications device command. If the decision is to confirm the communications device command, then the "Yes" branch is followed to step 516 to prompt the user to confirm or to provide a new voice command. Thereafter, the method continues back to step 510. If, however, the determination is made to not confirm the communications device command in step 514, then the method continues with step 518 and sends the communications device command to the communications device 130 via the user interface.

Figure 6:
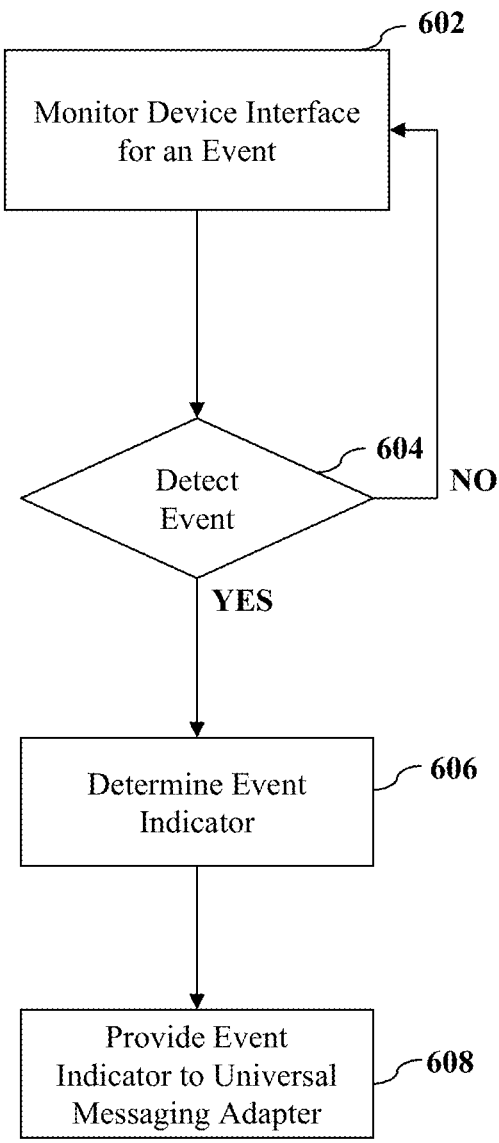
FIG. 6 is a flow chart illustrating a method for providing an event indicator according to exemplary embodiments of this invention.

FIG. 6 illustrates an exemplary method for providing event indicators. The universal messaging adapter 200 monitors the user interface 202 for an event in step 602. Typically, the events are predefined. For example, if the communications device is a mobile telephone, then the feature connector is monitored to detect an incoming call. If an event is not detected in step 604, then the No branch is followed to step 602 and monitoring continues. If an event is detected in step 604, then the Yes branch is followed to step 606. In step 606, an event indicator is determined. Typically, the user selects the event indicator during configuration of the universal messaging adapter 200 and the event indicator is stored in the memory 212, 216 of the universal messaging adapter 200. Once the event indicator is determined, the device interface provides the event indicator to the universal messaging adapter 200 in step 608.

FIG. 7 illustrates an exemplary map of a voice command associated with a communications device command according to some of the embodiments for a mobile telephone. As discussed above, the voice commands typically are selected by the user during configuration of the universal messaging adapter 200 and stored in memory. The "pick up" command 702 instructs the universal messaging adapter 200 to generate a command to the mobile telephone to answer an incoming call. The "hang-up" command 704 instructs the universal messaging adapter 200 to generate a command to the mobile telephone to disconnect a call.

The "Joe" command 706 instructs the universal messaging adapter 200 to generate a command to the mobile telephone to dial XXX.XXX.XXXX. The "Hair Salon" command 708 instructs the universal messaging adapter 200 to generate a command to the mobile telephone to dial YYY.YYY.YYYY. The entries for "Joe" 706 and "Hair Salon" 708 correspond to the user's personal directory. The user can select a voice command that identifies a person or business and corresponds to a telephone number, such as "Joe"—XXX.XXX.XXXX or "Hair Salon"—YYY.YYY.YYYY. The user uses these voice commands in combination with another voice command, such as a "dial" command 710 to place a call. For example, if the user says, "Ziggy, Dial Joe," then the universal messaging adapter 200 generates a communications device command that cause the communications device 130 to place a call to XXX.XXX.XXXX. If the universal messaging adapter 200 detects an incoming call from one of the telephone numbers stored in its memory, then the universal messaging adapter 200 identifies the caller to the user. For example, if the event indicator for an incoming call is "incoming call," then an incoming call from) XXX.XXX.XXXX is announced as "incoming call from Joe."

The user may refer to the same person or business using multiple identifiers. For example, the user may refer to Joe, as Joe and Joey. If so, then the "Joey" command may be a separate command or may be a pointer to the "Joe" command.

The "Dial" command 710 instructs the universal messaging adapter 200 to wait for digits or a voice command and to generate a command to the mobile telephone to place an outgoing call. An "Ignore" command 712 instructs the universal messaging adapter 200 to ignore the event so that no communications device command is generated. For example, the user may not want to answer an incoming call. If so, then when the universal messaging adapter 200 notifies the user of the incoming call, the user says "Ziggy, Ignore" and the universal messaging adapter 200 does not provide any additional notifications of the incoming call or provide a communications device command to the mobile telephone.

An "Okay" command 714 instructs the universal messaging adapter 200 to generate a send command to the mobile telephone communications device. The "Okay" command 714 can be used to indicate that a dialing sequence is complete. For example, the user can dial a seven-digit number by saying, "Ziggy, Dial ZZZ.ZZZZ, Okay" or dial a ten-digit number by saying "Ziggy, Dial ZZZ.ZZZ.ZZZZ, Okay."

In accordance with some of the embodiments, the "Okay" command 714 is used to confirm dialing instructions. For example, the user provides dialing instructions to the universal messaging adapter 200 by saying, "Ziggy, Dial ZZZ.ZZZ.ZZZZ, Okay." In response, the universal messaging adapter 200 provides a dialing confirmation messages, such as "Dialing ZZZ.ZZZ.ZZZZ." The user confirms the dialing instructions by saying, "Ziggy, Okay." Once the user confirms the dialing instructions the universal messaging adapter 200 provides the dialed number and a send command to the mobile telephone. If the user does not want to place the call, then the user does not respond and the universal messaging adapter 200 does not send the digits to the mobile telephone.

If the number being dialed is in the personal directory, then the universal messaging adapter 200 can use the personal directory to identify the person or business that is being called. For example, if the user says, "Ziggy, Dial XXX.XXX.XXXX," then the universal messaging adapter 200 can provide a dialing confirmation message of "Dialing Joe."

A "Voice Mail" command 716 is used with the voice mail provided by the universal messaging adapter 200. The "Voice Mail" command 716 instructs the universal messaging adapter 200 to generate a command to the mobile telephone to answer an incoming call. However, instead of the user participating in the call, the universal messaging adapter 200 plays an outgoing announcement to the caller and records a message from the caller. The "Voice Mail" command 716 provides voice mail to the user regardless of the availability of network voice mail. If voice mail is provided, then additional voice mail commands (not shown) are also needed to access the voice mail functions. For example, commands to play a message and delete a message are needed.

A "Create Directory Entry" command 718 is used to create a new voice command that corresponds to the user's personal directory. For example, if the user says, "Ziggy, create directory entry for Susan ZZZ.ZZZ.ZZZZ," then the universal messaging adapter 200 creates a new voice command "Susan" that corresponds to ZZZ.ZZZ.ZZZZ.

A "Sleep" command 720 is used to place the universal messaging adapter 200 in sleep mode. While in sleep mode, the universal messaging adapter 200 may not provide any event indicators. Sleep mode may be used when the user does not want to be interrupted. A "Wake up" command 722 is used to place the universal messaging adapter 200 in its normal mode. Other commands may include a "Stop" command 724 to discontinue an activated command, a "Record" command 726 to record an audio message by the user, an "Activate" command 728 to power on the communications device 130, a "Deactivate" command 730 to power off the communications device 130, a "Hang up" command 732 to disconnect the calling party, and an "Unrecognized voice command" 740 to alert the user of an error and prompt for an associated voice command and/or communications device command. Those of ordinary skill in the art understand that voice commands other than those illustrated in FIG. 7 are possible. For example, a voice command or a set of voice commands to support three-way calling can be included.

FIG. 8 illustrates an exemplary map of a communications device event associated with an event indicator for a mobile telephone. As discussed above, the event indicators typically are selected by the user during configuration of the universal messaging adapter 200 and stored in memory. An "Incoming call" event 802 instructs the universal messaging adapter 200 to play a message that states, "Incoming call" when the universal messaging adapter 200 detects that there is an incoming call on the mobile telephone. Typically, the incoming call message is played every time that the universal messaging adapter 200 detects a ring tone. An "Incoming call waiting" event 804 instructs the universal messaging adapter 200 to play a message that states, "Incoming call waiting" when the universal messaging adapter 200 detects that there is an incoming call waiting on the mobile telephone. Although not shown in FIG. 8, if the universal messaging adapter 200 provides voice mail, then an event indicator indicating the receipt of a message may also be included. Those of ordinary skill in the art understand that event indicators other than those illustrated in FIG. 8 are possible.

FIG. 9 illustrates some exemplary voice commands that may be used with an interactive pager, PDA, SMS enabled mobile telephone, and other electronic data communications devices. A "Read" command 902 instructs the universal messaging adapter 200 to retrieve a message from the pager and to play or read the message to the user. A "Reply" command 904 instructs the universal messaging adapter 200 to generate a command to the pager to send a reply message. The user provides the text of the reply message. For example, the user says, "Ziggy, Reply yes" to send a reply message that states "Yes." A "Delete" command 906 instructs the universal messaging adapter 200 to generate a delete command to the pager to delete a message. A "Joe" command 908 instructs the universal messaging adapter 200 to generate a command to the pager to send a message to joe@ipager.com. The user supplies the text for the message. The user can create a personal directory of pager addresses in a manner similar to that described above in connection with a personal directory of telephone addresses. The personal directory can be used by the universal messaging adapter 200 to announce that a "New message from Joe" has been received. Those of ordinary skill in the art understand that voice commands other than those illustrated in FIG. 9 are possible. For example, a voice command or a set of voice commands to Forward 910, Copy 912, store, or otherwise manage a message may be included.

FIG. 10 illustrates some exemplary event indicators for an interactive pager, PDA, SMS enabled mobile telephone, or other electronic data communications devices. The "New Message" event 1004 may instruct the universal messaging adapter 200 to play a message that states, "New message" when the hands-free communications device adapter 200 detects that a new message has been received by the pager. Those of ordinary skill in the art understand that event indicators other than those illustrated in FIG. 10 are possible.

The methods for using the universal messaging adapter 200 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the computer-readable medium to be easily disseminated.

Furthermore, the methods for using the universal messaging adapter 200 may also be physically embodied on or in any addressable (e.g., HTTP, I.E.E.E. 802.11, Wireless Application Protocol (WAP)) wireline or wireless communications device capable of presenting an IP address. Examples could include a computer, a wireless personal digital assistant (PDA), an Internet Protocol mobile phone, or a wireless pager.

While several exemplary implementations of embodiments of this invention are described herein, various modifications and alternate embodiments will occur to those of ordinary skill in the art. Accordingly, this invention is intended to include those other variations, modifications, and alternate embodiments that adhere to the spirit and scope of this invention.

The invention claimed is:

1. A method, comprising:
receiving, at a processor in a vehicle, an audio signal generated by a microphone from speech spoken by a user;
recognizing, by the processor, a command prefix in the audio signal, the command prefix representing a spoken word that is recognized as preceding any voice command;
identifying, by the processor, a next spoken word after the command prefix in the audio signal;
querying a memory operatively coupled to the processor for data representing the next spoken word, the memory storing electronic database associations between different words and different device commands;
retrieving, by the processor, a device command of the different device commands that is associated with the data representing the next spoken word after the command prefix; and
executing, by the processor, the device command.

2. The method of claim 1, further comprising answering a call in response to the device command.

3. The method of claim 1, further comprising generating a user interface that displays the device command.

4. The method of claim 1, further comprising displaying an event indicator.

5. The method of claim 1, further comprising executing a voice recognition algorithm to recognize the command prefix.

6. The method of claim 1, further comprising storing associations of different device commands with different next spoken words.

7. The method of claim 1, further comprising retrieving a stored voice greeting associated with the next spoken word.

8. An apparatus, comprising:
a processor; and
a memory storing instructions that, when executed by the processor, cause the processor to perform operations, the operations comprising:
receiving an audio signal generated by a microphone from speech spoken by a user;
recognizing, by the processor, a command prefix in the audio signal, the command prefix representing a spoken word in the speech that is recognized by the processor as preceding any voice command;
identifying a next spoken word after the command prefix as the voice command;
storing associations between different next spoken words and different vehicular commands;
retrieving a vehicular command of the different vehicular commands that is associated with the next spoken word; and
executing the vehicular command in response to the next spoken word after the command prefix.

9. The apparatus of claim 8, wherein the operations further comprise answering a call in response to the next spoken word.

10. The apparatus of claim 8, wherein the operations further comprise generating a user interface that displays the vehicular command.

11. The apparatus of claim 8, wherein the operations further comprise displaying an event indicator.

12. The apparatus of claim 8, wherein the operations further comprise executing a voice recognition algorithm to recognize the command prefix.

13. The apparatus of claim 8, wherein the operations further comprise retrieving a stored voice greeting associated with the next spoken word.

14. The apparatus of claim 8, wherein the operations further comprise receiving a communication.

15. A memory storing instructions that when executed cause a processor to perform operations, the operations comprising:
receiving an audio signal generated by a microphone from speech spoken by a user to control a feature in a vehicle;
recognizing a command prefix in the audio signal, the command prefix representing a spoken word in the spoken speech that is recognized as preceding any voice command;
identifying a next spoken word after the command prefix as the voice command;
storing associations between different next spoken words and different vehicular commands;
retrieving a vehicular command of the different vehicular commands that is associated with the next spoken word; and
executing the vehicular command in response to the next spoken word after the command prefix.

16. The memory of claim 15, wherein the operations further comprise answering a call in response to the next spoken word after the command prefix.

17. The memory of claim 15, wherein the operations further comprise generating a user interface that displays the vehicular command.

18. The memory of claim 15, wherein the operations further comprise displaying an event indicator.

19. The memory of claim 15, wherein the operations further comprise retrieving a stored voice greeting associated with the next spoken word.

20. The memory of claim 15, wherein the operations further comprise receiving a communication.

* * * * *